US008229876B2

(12) United States Patent
Roychowdhury

(10) Patent No.: US 8,229,876 B2
(45) Date of Patent: Jul. 24, 2012

(54) EXPEDITING K-MEANS CLUSTER ANALYSIS DATA MINING USING SUBSAMPLE ELIMINATION PREPROCESSING

(75) Inventor: Shounak Roychowdhury, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 507 days.

(21) Appl. No.: 12/552,011

(22) Filed: Sep. 1, 2009

(65) Prior Publication Data

US 2011/0055140 A1    Mar. 3, 2011

(51) Int. Cl.
*G06N 5/02* (2006.01)
(52) U.S. Cl. .......................................................... 706/54
(58) Field of Classification Search ...................... 706/54
See application file for complete search history.

(56) References Cited

U.S. PATENT DOCUMENTS 7,197,504 B1 * 3/2007 Runkler et al. ........................ 1/1
7,370,033 B1 * 5/2008 Roychowdhury ............ 707/602

OTHER PUBLICATIONS

An Iterative Clustering Procedure, Haralick, Robert M.; Dinstein, Its'Hak; Systems, Man and Cybernetics, IEEE Transactions on vol. 1 , Issue: 3 Digital Object Identifier: 10.1109/TSMC.1971.4308295 Publication Year: 1971 , pp. 275-289.*
iSky: Efficient and Progressive Skyline Computing in a Structured P2P Network, Lijiang Chen; Bin Cui; Hua Lu; Linhao Xu; Quanqing Xu; Distributed Computing Systems, 2008. ICDS '08. The 28th International Conference on Digital Object Identifier: 10.1109/ICDS.2008.40 Publication Year: 2008 , pp. 160-167.*
Recognition of multidimensional affine patterns using a constrained GA, Calafiore, G.; Bona, B.; Neural Networks,1997., International Conference on vol. 2 Digital Object Identifier: 10.1109/ICNN.1997.616210 Publication Year: 1997, pp. 1235-1239 vol. 2.*
Cluster analysis for multivariable process control Sutanto, E.; Warwick, K.; American Control Conference, 1995. Proceedings of the vol. 1 Digital Object Identifier: 10.1109/ACC.1995.529350 Publication Year: 1995, pp. 749-750 vol. 1.*
D. Arthur and S. Vassilvitskii, "How Slow is the K-Means Method?" *Symposium on Computational Geometry*, 2006, pp. 144-153.
P. S. Bradley and U. M. Fayyad, "Refining Initial Points for K-Means Clustering," *Proc. 15 International Conference on Machine Learning*, 1998, pp. 91-99.
C. Elkan, "Using the Triangle Inequality to Accelerate K-Means," ICML, 2003, pp. 147-153.
F. Farnstrom, J. Lewis, and C. Elkan, "Scalability of Clustering Algorithms Revisited," *ACM SIGKDD Explorations*, vol. 2, 2000, pp. 51-57.
S. Har-Peled and Bardia Sadri, "How Fast is the K-Means Method?" *Algorithmica*, 41(3), 2005, pp. 185-202.
M. Inaba, H. Imai, and N. Katoh, "Experimental Results of a Randomize Clustering Algorithm," *Proc. 12th Ann. ACM Symp. Computational Geometry*, 1996, pp. C1-C2.

(Continued)

*Primary Examiner* — Michael B Holmes
(74) *Attorney, Agent, or Firm* — Campbell Stephenson LLP

(57) ABSTRACT

Improved efficiencies of data mining clustering techniques are provided by preprocessing a sample set of data points taken from a complete data set to provide seeds for centroid calculations of the complete data set. Such seeds are generated by selecting a uniform sample set of data points from a set of multi-dimensional data and then seed values for the cluster determination calculation are determined using a centroid analysis on the sample set of data points. The number of seeds calculated corresponds to a number of data clusters expected in the set of multi-dimensional data points. Seed values are determined using subsample elimination techniques.

20 Claims, 9 Drawing Sheets

OTHER PUBLICATIONS

A. K. Jain, M. N. Murty, and P. J. Flynn, "Data Clustering: A Review," *ACM Computing Surveys*, vol. 31, No. 3, 1999, pp. 264-323.

T. Kanungo, D. M. Mount, N. S. Netanyahu, C. D. Piatko, R. Silverman, and A. Y. Wu, "An Efficient K-Means Clustering Algorithm: Analysis and Implementation," *IEEE Transactions on Pattern Analysis and Machine Intelligence*, vol. 24, No. 7, 2002, pp. 881-892.

D. Pelleg and A. Moore, "Accelerating Exact K-Means Algorithms with Geometric Reasoning," *Proc. ACM SIGKDD International Conference on Knowledge Discovery and Data Mining*, 1999, pp. 277-281.

* cited by examiner

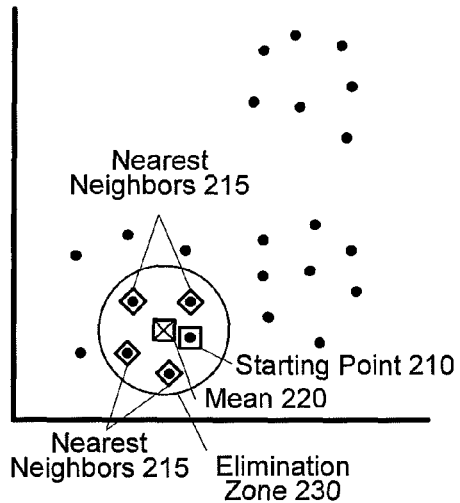
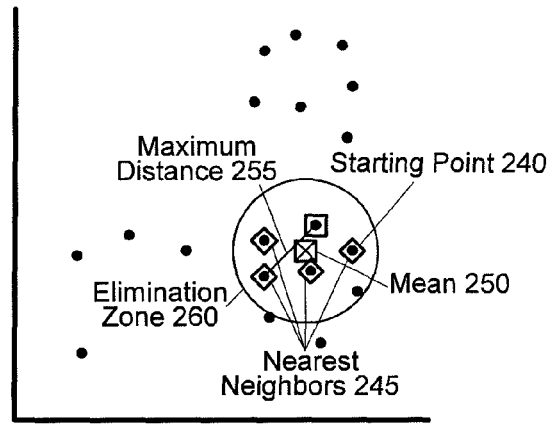
Figure 2A
Figure 2B
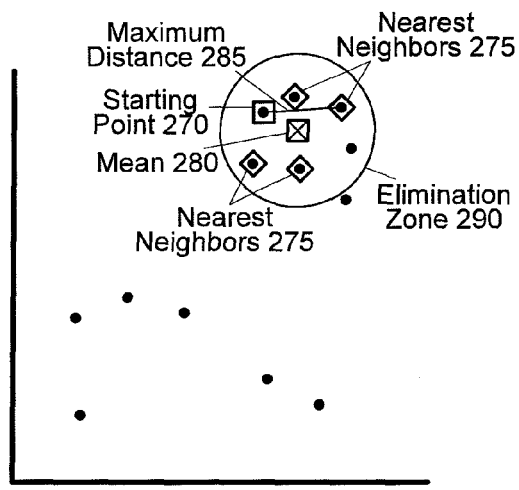
Figure 2C

EXPEDITING K-MEANS CLUSTER ANALYSIS DATA MINING USING SUBSAMPLE ELIMINATION PREPROCESSING

FIELD OF THE INVENTION

Embodiments of the present invention relate to the field of data mining, and specifically to using subsample elimination preprocessing to generate initial seeds for k-means cluster analysis of multi-dimensional data sets.

BACKGROUND OF THE INVENTION

During the course of business activities, an entity can collect and store large amounts of data related to those activities. In order to determine data patterns of importance to the business entity, data mining is used to extract those patterns, thereby transforming the data into useful information to the business entity. As the amount of data collected by business entity increases, the efficiency of automated techniques for analyzing that data should increase in order to allow for timely analysis.

Data mining in a customer relationship management application can contribute significantly to a bottom line of the business entity. For example, rather than randomly contacting a prospect or a customer through a call center or sending mail, the business entity can concentrate its efforts on prospects that are predicted to have a high likelihood of responding to an offer. Data mining techniques, including data clustering, can be used to automatically ascertain segments or groups within a customer data set that have higher likelihoods of responding to offers.

Cluster analysis techniques for data mining generally assign a set of observations of the data into subsets, or clusters, so that the observations of the same cluster are similar in some sense. For a multi-dimensional data set (e.g., a database table having a plurality of columns [dimensions] for each entry), spatial analysis techniques can be used to analyze the multi-dimensional data to determine cluster locations. Analysis techniques such as k-means clustering can be used to determine a centroid of a cluster in the multi-dimensional space. Information about the location of the centroid in the multi-dimensional space can be used to determine general characteristics of data entry points forming the cluster. Such information can then be used by the business entity in making decisions related to the data mining task.

As data sets increase in the number of entries, the number of dimensions for each entry (e.g., the number of columns), or the number of clusters present in a data set, the time required to perform a clustering analysis such as k-means clustering also increases due to an increase in computational complexity. Such increased computation time demands increased computer resources as well as potentially making the data set unavailable for other tasks. It is therefore desirable to improve the efficiency of clustering analysis, thereby reducing those resource demands.

SUMMARY OF THE INVENTION

Embodiments of the present invention improve efficiencies of data mining clustering techniques by preprocessing a sample set of data points taken from a complete data set to provide seeds for centroid calculations of the complete data set. Embodiments of the present invention generate such seeds by selecting a uniform sample set of data points from a set of multi-dimensional data and then determine seed values for the cluster determination calculation using a centroid analysis on the sample set of data points. The number of seeds calculated corresponds to a number of data clusters expected in the set of multi-dimensional data points. Embodiments of the present invention perform such a determination using subsample elimination techniques.

In one embodiment of the present invention, a mechanism is provided for selecting a sample set of data points from a set of multidimensional data points, selecting a number of data clusters to determine in the set of multidimensional data points, determining seed values for a cluster centroid calculation of the number of data clusters using the sample set of data points, and performing the cluster centroid calculation for the set of multidimensional data points using the seed values. One aspect of the above embodiment provides for determining the seed values by selecting a first data point of the sample set of data points, determining a set of nearest neighbor data points to that first data point from the sample set of data points, calculating a first mean location value of the set of nearest neighbor data points and the first data point, and setting a first seed value equal to the first mean location value.

In a further aspect of the above embodiment, the distance between the first data point and the nearest neighbor data point farthest from the first data point is determined, and then all data points of the sample set of data points located within a region defined by the first mean location value and the determined distance are removed. The process of selecting data points, means and nearest neighbor elimination is then repeated for the number of selected data clusters.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIGS. 2A-C illustrate application of embodiments of a subsample elimination mechanism, usable by embodiments of the present invention.

DETAILED DESCRIPTION

Figure 1A:
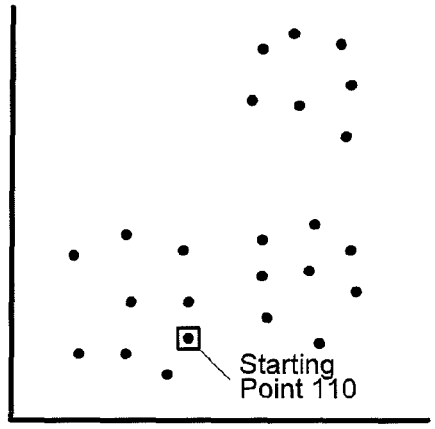
FIGS. 1A-D illustrate a two-dimensional spatial example of a subsample elimination preprocessing mechanism, usable by embodiments of the present invention.

The computational complexity of a data mining cluster centroid analysis is directly proportional to a number of data points in a data set, a number of dimensions of the data set, and a number of clusters being determined. As any of these values increases, the cluster centroid analysis, which is an iterative process, executes for a larger number of iterations and a longer amount of time. Embodiments of the present invention decrease the amount of computation necessary to determining cluster centroids for data sets with a large number of data points by performing a centroid analysis calculation on a subsample of the complete data set in order to determine initial seeds for the complete data set calculation. The centroid calculation on the subsample set requires fewer iterations than the full data set because there are fewer data points being solved for.

Embodiments of the present invention improve efficiencies of data mining clustering techniques by preprocessing a sample of a complete data set to provide seeds for centroid calculations of the entire data set. Embodiments of the present invention generate such seeds by selecting a uniform sample set of data points from a set of multi-dimensional data and then determine seed values for the cluster determination calculation using a centroid analysis on the sample set of data points. The number of seeds calculated corresponds to a number of data clusters expected in the set of multi-dimensional data points. Embodiments of the present invention perform such a determination using subsample elimination techniques.

In one embodiment of the present invention, subsample elimination is performed by selecting a first data point from the sample set of data points, determining a set of nearest neighbor data points to the first data point from the sample set of data points, calculating a mean location value of the set of nearest neighbors and the first data point, and setting the value of the location of a seed for centroid calculation to the mean location value. Using information about the set of nearest neighbors and the first data point, aspects of the present invention determine a region in the multi-dimensional space within which all sample data points are eliminated from the sample set. Subsequently, the process is repeated by selecting a new data point within the modified sample set, determining the nearest neighbors to that, and a mean location value of that set of nearest neighbors. Embodiments of the present invention can use a variety of calculation methods to determine the set of nearest neighbors, including, for example, kd-tree analysis.

Since the sample set of data points is chosen uniformly from the set of multi-dimensional data points, it is expected that the sample set of data points reflects topology characteristics of the set of multi-dimensional data points, including the presence of data clusters. Testing has determined that nearest-neighbor subsample elimination techniques, such as those discussed herein, result in seed values for centroid analysis of the full set of multi-dimensional data points that provide rapid convergence to cluster centroids.

For very large data sets, a first sample set of data points that contains enough information to determine centroid calculation seeds may still be so large as to involve significant calculation just to determine the seeds for the full set of data. In such cases, embodiments of the present invention can provide for selecting a second sampling of data points from the first sample upon which to generate seeds for the cluster centroid calculation of the first sample.

Data Mining for Clusters

In general, data mining is a practice of automatically searching large stores of data in order to discover patterns and trends that go beyond simple analysis. Data mining can use sophisticated mathematical algorithms in order to segment the data and evaluate probabilities of future events. Certain forms of data mining identify natural groupings in the data. For example, a model may identify a segment of a population that has an income within a specified range, that has a good driving record, and that leases a new car on a yearly basis. Each of these criteria is a dimension of a set of data being analyzed.

Embodiments of the present invention relate to data mining methods using clustering analysis. Clustering is used to segment the set of data. Clustering analysis finds clusters of data objects that are similar in some sense to one another. Members of a cluster are more like each other than they are like members of other clusters. A goal of clustering analysis is to find high-quality clusters such that the inter-cluster similarity is low and the intra-cluster similarity is high. Clustering models segment data into groups that have not been previously defined. Clustering is therefore useful for exploring data. Clustering algorithms can be used to find natural groupings. Clustering can also serve as a useful data processing step to identify homogeneous, or nearly homogeneous, groups on which other types of data mining models may be exercised.

Cluster computation can be performed in a variety of ways, including, for example, grouping data objects into a hierarchy of clusters, partitioning data objects into a given number of clusters, grouping neighboring data objects into clusters based on local conditions, and dividing the data space into cells and combining adjacent high-density cells to form clusters. A centroid of a cluster represents a most typical case for the cluster. For example, in a data set of customer ages and incomes, the centroid of a cluster would be a customer of average age and average income in that cluster. If the data set included gender, the centroid would also have the gender most frequently represented in the cluster. A centroid is, in essence, a prototype of the cluster. The centroid does not necessarily describe any specific data point included in the cluster. Attribute values for a centroid of a cluster are the mean of the numerical attributes and the mode of the categorical attributes of data points comprising the cluster.

There are a variety of methods that can be used for clustering data. One method that can be used for cluster analysis of multi-dimensional data sets is a k-means algorithm. The k-means algorithm is a distance-based clustering algorithm that partitions the data into a predetermined number of clusters. Distance-based algorithms rely on a distance metric to measure similarity between data points. The distance metric can be either Euclidean or Cosine. Data points are assigned to the nearest cluster according to the distance metric used.

Clustering methods, such as k-means, locate cluster centroids using an iterative approach. An initial spatial location, or seed, is chosen and the clustering mechanism refines that seed location to the centroid through a repeated series of steps. The closer an initial seed is to the actual location of a centroid, the faster the clustering algorithm converges upon the centroid.

The convergence speed of a clustering method, such as k-means, is also dependent upon the number of dimensions of the data being analyzed, the number of clusters of interest within the data set, and the size of the data set itself, as well as the locations of the initial seeds of the cluster centroids. Typical data sets for a business entity can be very large, encompassing terabytes of data. Further, such data sets can involve entries having a large number of dimensions. For example, a customer relationship management database could have entries describing a customer base, having dimensions including address, age, income, gender, health-related information, job-related information, and the like. Other types of high-dimensionality data could include bioinformatics data, and bioimaging data such as CT scans and MRIs. A pixel in such imaging data is a high dimension data point that could require analysis. Convergence time for a centroid location method such as k-means will increase as the number of dimensions and the number of data points in a set of data increases. Thus, the closer an initial seed is to a corresponding centroid, the fewer number of iterations the centroid finding mechanism requires to locate the centroid and the faster information can be provided to a user or subsequent data mining processes.

Data can be mined whether it is stored in flat files, spreadsheets, database tables, or some other storage format. An important criterion for the data is not the storage format itself, but the applicability of the data to the problem being solved. Examples discussed below will refer to the data being analyzed as part of a database, but embodiments of the present invention are not limited to data stored in a database.

Subsample Elimination Seed Determination for Cluster Centroid Location

Convergence to a centroid of a cluster for iterative centroid-determination methods can be expedited by selection of an initial seed in close proximity to the centroid. Selection of such an initial seed can be provided by preprocessing a sample of the full set of multi-dimensional data points. In order to reduce overall processing time, a balance should be struck between the amount of time spent during preprocessing and the amount of time spent during the actual processing to locate the centroid.

Embodiments of the present invention select a sample set of data points from the full set of multi-dimensional data points. In order to control the amount of time spent during preprocessing, the size of the sample set should be much smaller than the size of the full set of data. But the sample size should still be sufficiently large to capture the underlying structure of the full set of data in a skeletal fashion. Thus, the size of the sample set is dependent upon the size and nature of the full set of data.

FIGS. 1A-D illustrate a two-dimensional spatial example of the subsample elimination preprocessing mechanism used by embodiments of the present invention. Use of a two-dimensional space in the figures is to provide a simplified illustration for discussion purposes, and it should be understood that embodiments of the present invention are not limited to two-dimensional data sets.

The points illustrated in FIG. 1A are a sample of a full data set having three clusters of data. The sample data points are selected at random from the full data set and represent a uniform distribution of data points from the full data set.

Figure 1B:
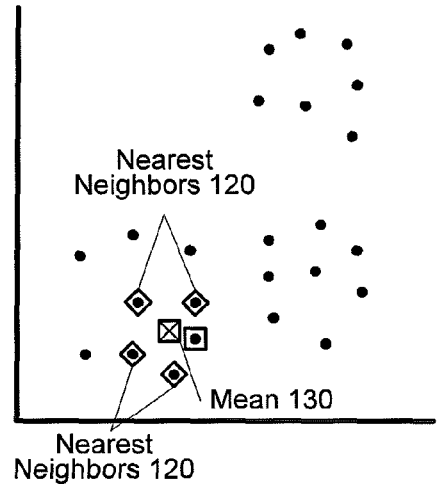

Embodiments of the present invention randomly select a starting point 110 from the random sample set of data points. In one embodiment of the present invention, the random selection of a data point is user-directed. Once the starting point is selected, embodiments of the present invention then locate N nearest neighbors to the starting point. A nearest neighbor determination can be performed by use of a number of algorithms, including, for example, a kd-tree analysis. FIG. 1B illustrates a selection of four nearest neighbors 120 to starting point 110. The number of nearest neighbors ascertained can be dependent upon the size of the sample data set and a desired proximity of an initial seed to an ultimately determined centroid of a cluster. The larger N is, the more time will be spent during preprocessing.

Embodiments of the present invention then also calculate a mean location 130 of the starting point 110 and nearest neighbors 120. The value of the location of mean 130 is the seed value for the centroid calculation of the full set of data.

Figure 1C:
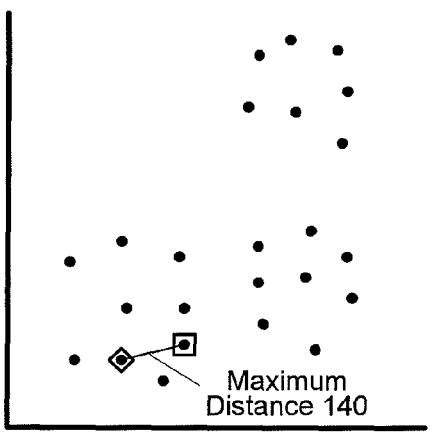
Figure 1D:
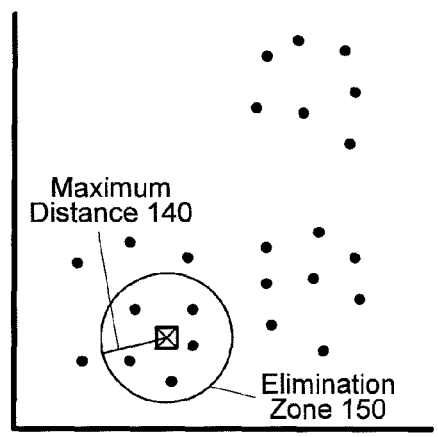

Embodiments of the present invention further calculate a distance between starting point 110 and the most distant nearest neighbor 120. FIG. 1C illustrates this maximum distance 140. A region of space is then determined that is centered at mean 130 with a radius of maximum distance 140 (e.g., a circle for a two-dimensional space and a sphere for a three-dimensional space). FIG. 1D illustrates this determined region as elimination zone 150. Embodiments of the present invention then remove all sample data points within elimination zone 150 from the sample set and proceed with calculating additional seeds, if there are further seeds to be calculated.

FIGS. 2A-C further illustrate application of embodiments of the subsample elimination mechanism. FIG. 2A illustrates the same sample set of points shown in FIG. 1. A starting point 210, nearest neighbors 215, mean 220, maximum distance 225, and elimination zone 230 are illustrated for the starting point. As discussed above, all sample points located within elimination zone 230 are removed from the sample set of data points once mean 220 is determined.

FIG. 2B illustrates a second set of points determined after elimination of the subset of data points from FIG. 2A. FIG. 2B illustrates a selected starting point 240, nearest neighbors 245, mean 250, maximum distance 255, and an elimination zone 260. These points are calculated in the same manner as those discussed above for FIGS. 1 and 2A. Mean 250 becomes a second seed for determination of a centroid of a second cluster in the full data set. Again, all data points within elimination zone 260 are removed from the sample set of data points.

FIG. 2C illustrates a third seed determination after the first and second sets of data points are removed, as discussed above. FIG. 2C illustrates a starting point 270, nearest neighbors 275, mean 280, maximum distance 285, and elimination zone 290. Mean 280 becomes a third seed for calculation of a cluster centroid from the full set of data.

For FIGS. 2A-C, the number of clusters to be determined is three and the number of nearest neighbors calculated is four.

Once determined using subsample elimination, the values for the seeds are used in the iterative calculation of cluster centroids. With a sufficient number of points in the sample set and a sufficient value of N, results of the subsample elimination process generate seeds that are in the region of the centroids of the full set of data. This is due to the samples from which the seeds are drawn being representative of the topology of the full set of data. Since the sample set of data points is drawn in a uniform fashion from the full set of data. Further, the sample set of data points is chosen to be large enough to reflect the overall topology of the full set of data points.

Figure 3A:
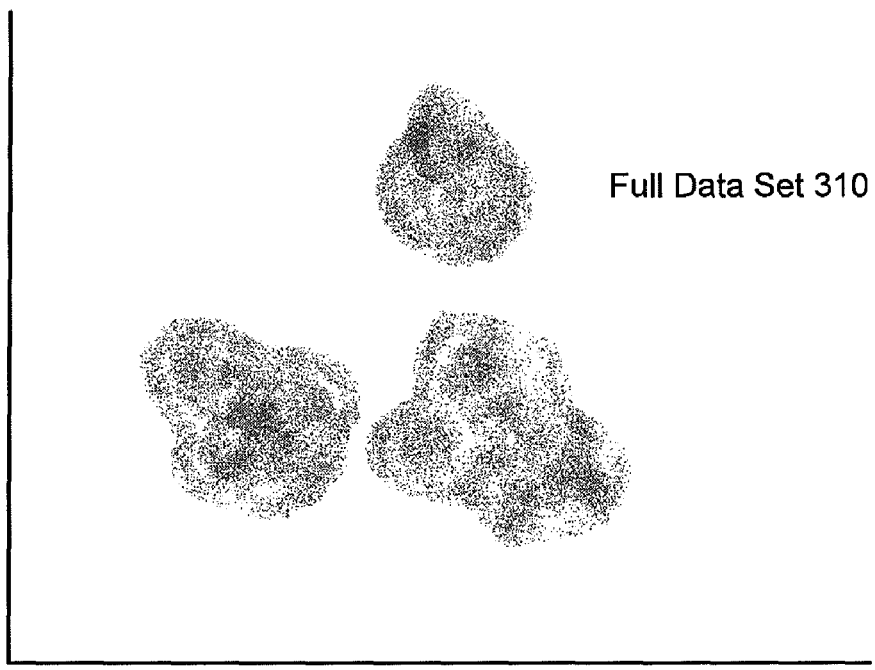
FIGS. 3A-B illustrate results of an iterative (e.g., k-means) process for determining cluster centroids, usable in conjunction with embodiments of the present invention.

FIGS. 3A and B illustrate results of the iterative (e.g., k-means) process for determining cluster centroids. FIG. 3A illustrates distribution of a two-dimensional data set. Data is distributed throughout the space, but congregates around three clusters.

Figure 3B:
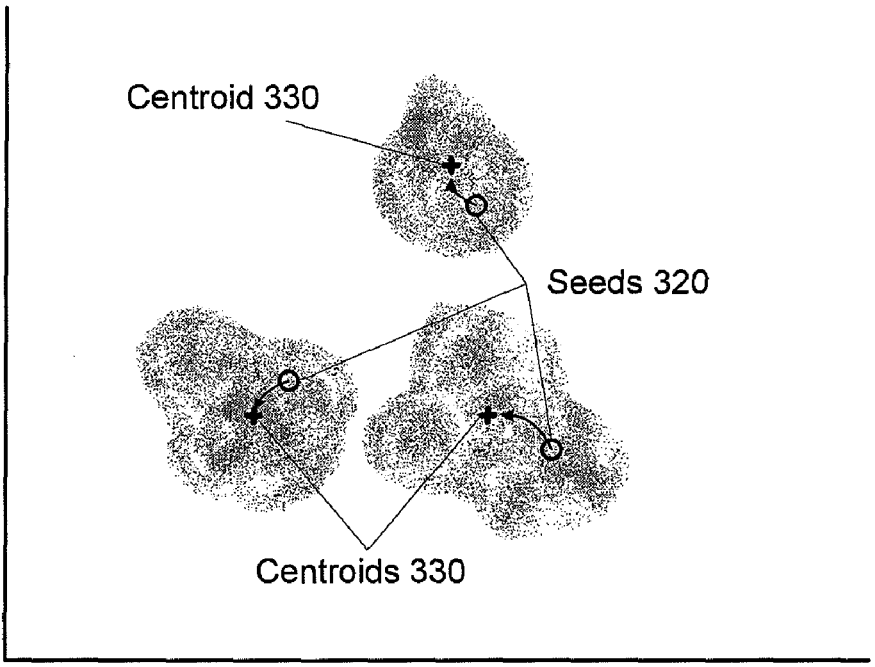

FIG. 3B illustrates a correlation between seeds generated from the above-described subsample elimination method and the actual centroids of the full set of data. The circles in FIG. 3B correspond to generated seeds 320 for each cluster. When the centroid calculation process is performed, the iterative process causes the initial seed value to converge upon the centroid of each cluster. Cluster centroids 330 are illustrated by plus signs. As can be appreciated, the closer an initial seed is to the actual centroid of a cluster, the faster the iterative cluster centroid process will converge upon the centroid.

Figure 4A:
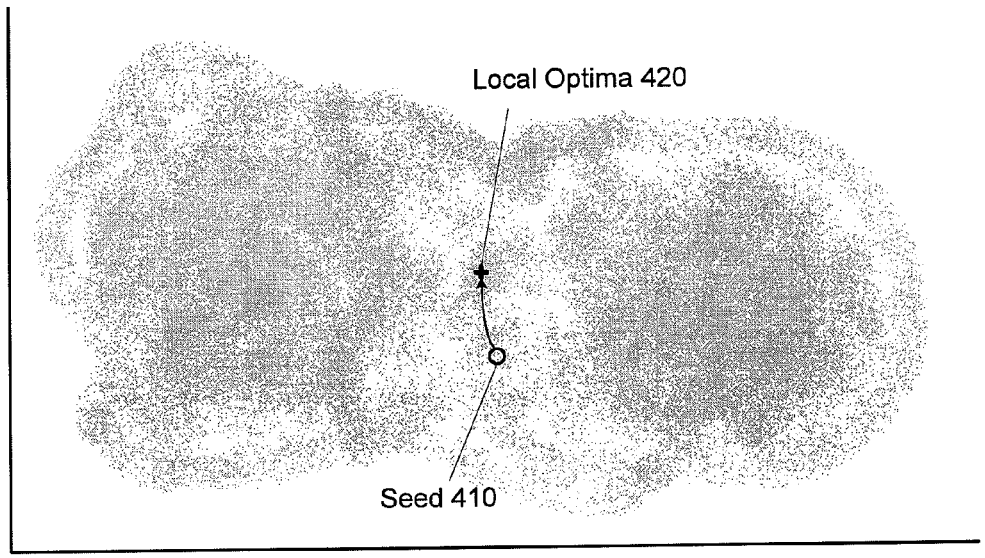
FIGS. 4A-B illustrate a result of using embodiments of the present invention to generate initial seeds for determining cluster centroids of an example data set.

Embodiments of the present invention provide an additional advantage over merely randomly selecting initial seeds for cluster centroid calculation. As illustrated in FIG. 4A, a distribution of data points associated with two or more clusters may merge in such a way that a local optima may be present within the data set. If an initial seed were chosen that happened to be close to the local optima (e.g., seed 410) then the centroid calculation could result in a false centroid located at local optima 420.

Figure 4B:
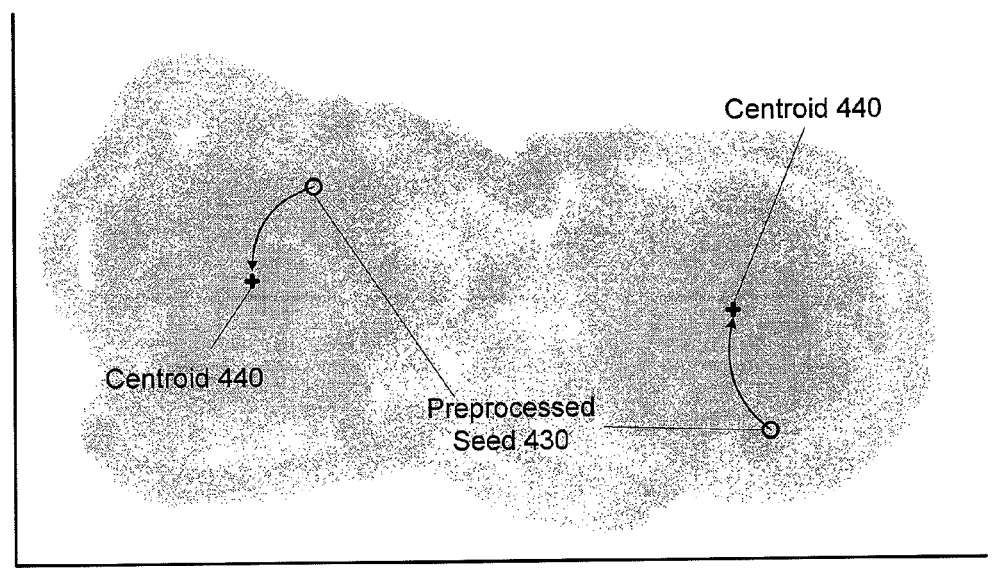

FIG. 4B illustrates a result of using embodiments of the present invention to generate initial seeds for the same data set. A subsample methodology such as that discussed above can result in seeds 430 in regions closer to cluster centroids 440. Since the seed values are closer to the actual cluster centroids, there is an increased likelihood that the cluster centroid calculation will provide a centroid calculation that accurately reflects the data. Therefore, more accurate data mining results can be provided.

Figure 5A:
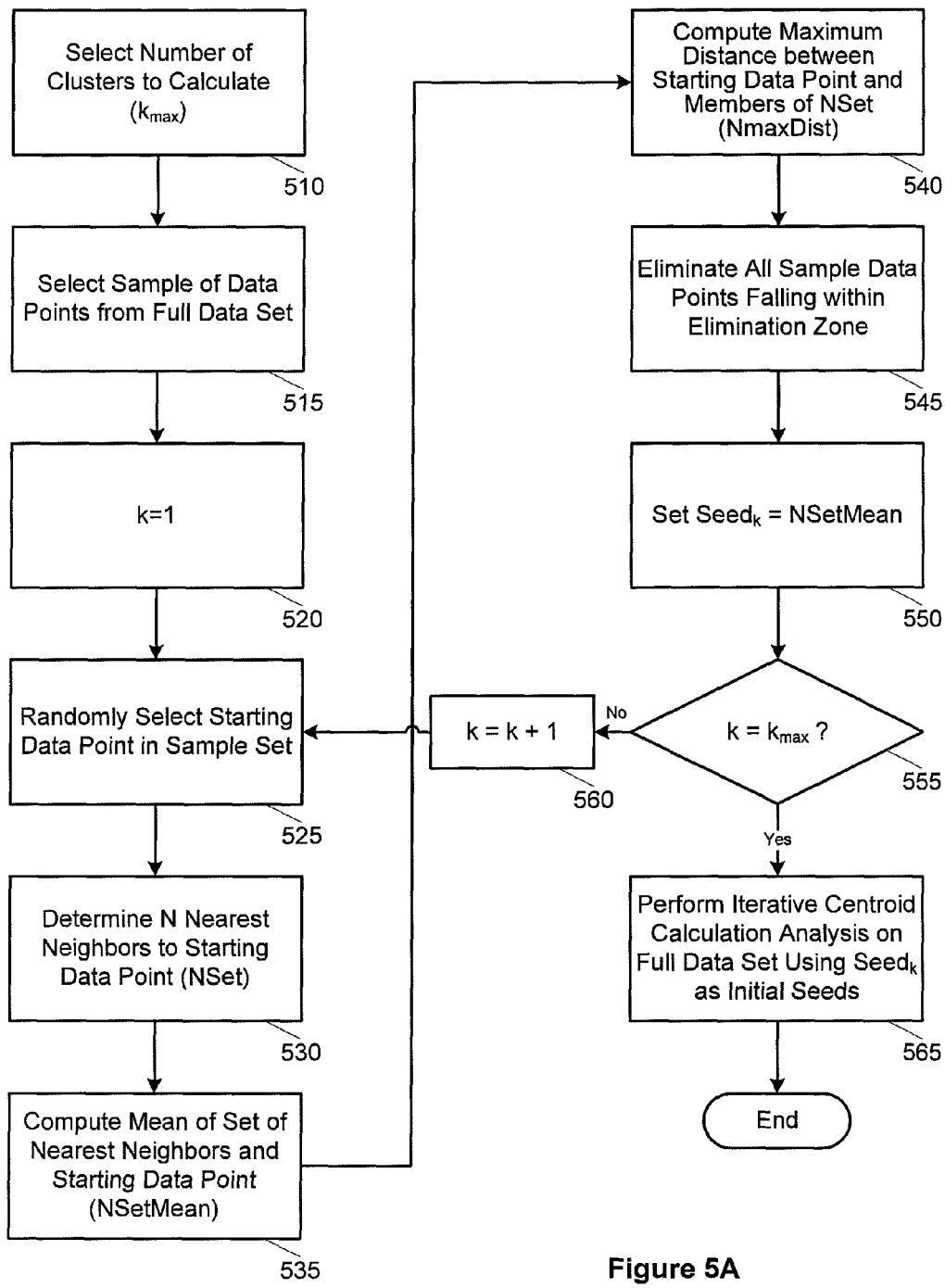
FIG. 5A is a simplified flow diagram illustrating the subsample elimination method usable in accord with embodiments of the present invention.

FIG. 5A is a simplified flow diagram illustrating steps performed in the subsample elimination method described above. As the process begins, embodiments of the present invention receive a selected number of clusters to calculate ($k_{max}$) (510). The number of clusters to calculate can be either user-selected after examination of the full data set, or can be automatically calculated and provided to the mechanism performing the subsample elimination method. A random sample of data points is selected from the full data set (515). Such a sample of data points is intended to be a uniform selection of data points from the full set of multi-dimensional data points. The sample of data points should be significantly smaller than the full set of data points in order to reduce preprocessing time, but still capture the general topology of the full set of data points. The percentage of data chosen to be part of the sample can be dependent upon the nature of the data in the full data set (e.g., number of data points, number of dimensions, number of clusters, and cluster overlap).

For the initial pass of the subsample elimination method, a counter (k) can be initialized (520). A starting point for the subsample elimination is then selected at random (525). A determination is then made of the N nearest neighbors to the starting data points (NSet) (530). While increasing the number of nearest neighbors that are determined may improve values of an initial seed, this will also increase the amount of time spent during preprocessing. Therefore, a value of N is chosen such that a reasonable value for an initial seed is found so that the combined time for preprocessing and the iterative processing to determine a centroid is minimized. As discussed above, the nearest neighbor calculation can be performed using standard methods for determining nearest neighbors in a multi-dimensional space (e.g., kd-tree algorithms).

Once the set of nearest neighbors is determined, a location of a mean of the set of nearest neighbors and the starting data point is computed (NSetMean) (535). A distance between the starting data point and the furthest determined nearest neighbor is also determined (NmaxDist) (540). All sample data points falling within an elimination zone whose center is NSetMean and a radius of NmaxDist are eliminated from the sample set (545). Thus, an elimination zone for a two-dimensional data set is a circle centered on NsetMean with a radius of NmaxDist and, in a three-dimensional space, the elimination zone is a sphere having a center of NsetMean and a radius of NmaxDist.

The computed mean of the set of nearest neighbors, NsetMean, is set to be a seed value for the cluster centroid calculation of the full set of data (550). A determination is made as to whether seed values for each cluster have been determined (555). If not, then the counter can be incremented (560) and the process reiterated starting at selecting a new starting data point (525). If all of the requested seed values have been calculated, then a cluster centroid calculation analysis can be performed on the full data set using the calculated seeds (565). As discussed above, such cluster centroid calculation methods can include k-means algorithms, or other iterative approaches.

Figure 5B:
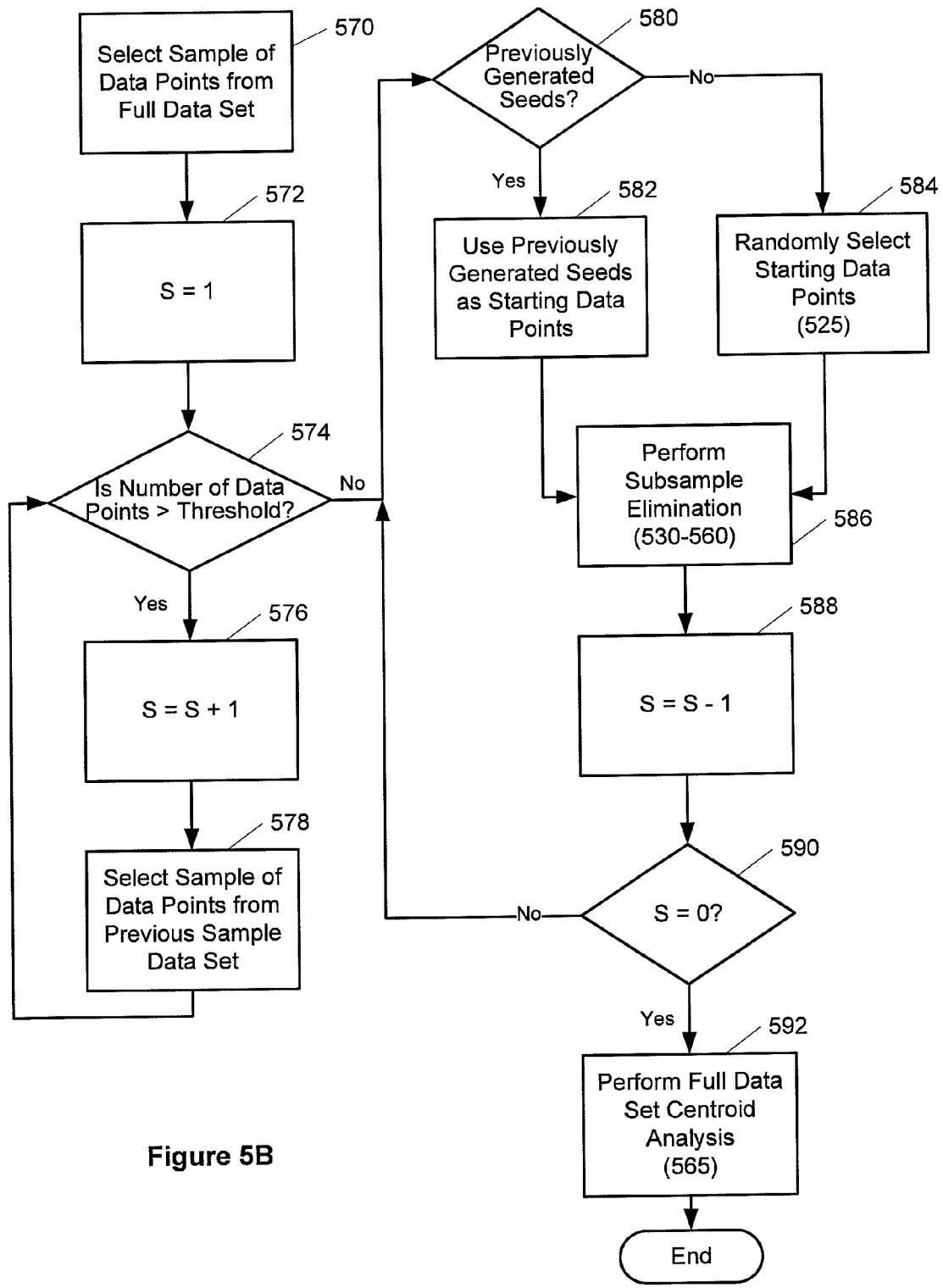
FIG. 5B is a simplified flow diagram illustrating recursive use of the subset elimination method usable in accord with embodiments of the present invention.

FIG. 5B is a simple flow diagram illustrating recursive use of the subset elimination method, in accord with embodiments of the present invention. When the full set of data has a very large number of data points, taking a percentage of that full set of data points to generate a first sample of data points may also contain a very large number of data points. In such a situation, the subsample elimination method may take an unacceptable amount of time and iterations. A subsequent percentage of data points can be taken from the first sample to generate a second sample. The subsample elimination method can be used on the second sample of data points to generate seed values that can be used as initial values in a subsample elimination of the first sample of data points. In this manner, the subsample elimination method can be used recursively to generate seeds to be used in a centroid analysis of the full set of data.

A sample set of data points is first selected from the full data set (570). As illustrated in FIG. 5A, this first sample set of data points is a randomly selected percentage of data points from the full data set. A sample counter is set to an initial value (572). A determination is then made as to whether the number of data points in the sample is greater than a pre-set threshold (574). The threshold value is a number below which the subsample elimination method of FIG. 5A is acceptably efficient. The threshold can be determined experimentally. If the number of data points is above the threshold value, then the sample counter can be incremented (576) and a next sample of data points can be randomly selected from the previous set of sample data points (578).

If the number of data points is below the threshold value, then the process proceeds to performing the subsample elimination method on the samples. A determination is made as to whether seeds have been previously generated (e.g., from a subsample of the current sample) (580). If seeds have been previously generated, then those seeds are used as starting data points for the subsample elimination method (582). If no seeds have been previously generated (e.g., the current sample is the lowest level sample), then a random selection of a starting data point can be performed, as in step 525 of FIG. 5A (584). Using these starting data points, the subsample elimination method of FIG. 5A can be performed to determine seed values (e.g., steps 530-560) (586).

Once seed values have been calculated for the current sample set, the sample counter is decremented (588) and a determination can be made as to whether the current sample set is the highest level sample set (e.g., the first sample set of the full set of data) (590). If the current sample set is not the highest level sample set, then the process repeats the subsample elimination method (580-590). If the current sample set is the highest level sample set, then the process continues to using the calculated seeds in a full data set centroid analysis (e.g., step 565) (592).

Example Database Environment

Embodiments of the present invention can be used to analyze data collected by a business entity for trends and other observations important to the business entity. Such information can be collected by a variety of mechanisms. One such mechanism can be an enterprise-wide customer relationship management architecture. A customer relationship management system can collect data associated with customers, products, services, support, costs, revenue and employee information by the system's nature of being accessible to all aspects of an enterprise.

Figure 6:
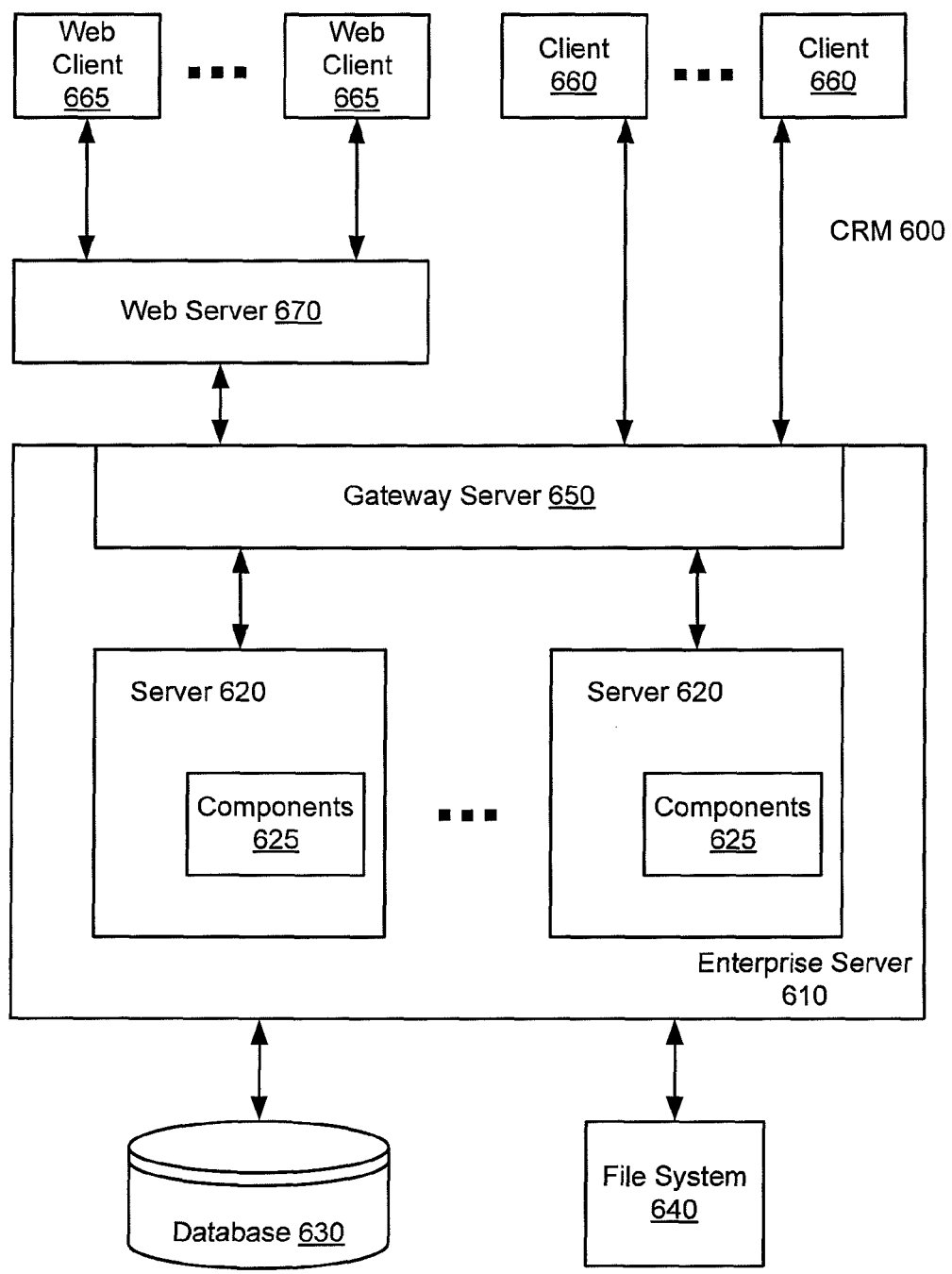
FIG. 6 is a simplified block diagram illustrating a customer relationship management architecture usable in conjunction with embodiments of the present invention.

FIG. 6 is a simplified block diagram illustrating a customer relationship management architecture usable in conjunction with embodiments of the present invention. The illustrated customer relationship management environment includes an enterprise server 610 that is a logical grouping of one or more servers 620 that support a group of clients (660, 665) accessing a common database 630. An enterprise server can be configured, managed and monitored as a single logical group, allowing an administrator to start, stop, monitor or set parameters for servers 620 within enterprise server 610. In such a configuration, parameters for the customer relationship management system can be set at the enterprise server level, and these parameters can apply to every server operating within the enterprise server. In addition, other parameters can be adjusted at a server (620) level to support fine tuning of those parameters. In this hierarchical parameter context, if a parameter is set at a server level, then the server-specific value for the parameter can override an enterprise server-level setting for the parameter. Further, parameter settings at a component level (processes executed on servers 620) will override those set at the server level.

A server 620 can support back-end and interactive processes for each client accessing the server. These processes are illustrated as one or more components 625 within each server. Examples of component processes include, for example, mobile web client synchronization, operation of business logic for web clients, connectivity and access to database and file system for clients, integration with legacy or third-party data (e.g., data not native to the CRM system), automatic assignment of new accounts, opportunities, service requests, and other records, and workflow management. Embodiments of rules-based decision-making modules can be associated with any of the component processes listed above. A server 620 can support, for example, multi-process and multi-threaded components, and can operate components in background, batch, and interactive modes. A server component can also operate on multiple servers 620 simultaneously to support an increased number of users or larger batched workloads.

Servers 620 are coupled to a gateway server 650 illustrated as part of enterprise server 610. Gateway server 650 can coordinate the operations of enterprise server 610 and servers 620. A gateway server can provide persistent storage of enterprise server configuration information, including, for example, definitions and assignments of component groups and components, operational parameters, and connectivity information. A gateway server can also serve as a registry for server and component availability information. For example, a server 620 within enterprise server 610 can notify gateway server 650 of availability. Connectivity information such as network addresses can be stored in a storage accessed by gateway server 650. If a server 620 shuts down or otherwise becomes unavailable, connectivity information related to that server can be cleared from gateway server 650.

Through their relationship in enterprise server 610, servers 620 and their components 625 access one or more databases 630 or file systems 640. CRM systems employing embodiments of the present invention can include as one or more components 625 the rules-based decision-making engine. Database 630 can store, for example, RDBMS client software and tables, indexes, and data related to all operations impacted by the CRM system. Database information can include, for example, customer information, market data, historical pricing information, current pricing information, contact information, and the like. Similarly, file system 640 can store data and physical files used by clients 660 and 665 and enterprise server 610. File system 640 can be a shared directory, or set of directories on different devices, which is network accessible to all servers 620 in enterprise server 610. In order for a client to gain access to files in file system 640, a client can connect to an appropriate server 620 to request file uploads or downloads. Server 620 can then access file system 640 using, for example, a file system management component.

As stated above, embodiments of the data mining processes of the present invention can be implemented to execute on one or more of servers 620, accessing database 630 to store and retrieve data. An alternative embodiment provides a separate server accessible by the same or different web server. The separate server can provide access to database 630 or a copy thereof. Data mining processes can also execute on one or more of clients 660 or web clients 665, accessing the database and file server information through gateway server 650.

Clients 660 and 665 provide access to enterprise server 610 for agents using the customer relationship management system. Clients communicate to enterprise server 610 through gateway server 650 either directly (e.g., clients 660) or via a web server 670 (e.g., clients 665). A web server 670 can provide a mechanism by which enterprise server 610 can respond to web-based requests (e.g., HTML, XML, and the like). Web clients 665 can include clients coupled to web server 670 via a local area network, metro-area network or wide area network and propagated over a variety of communications media, as discussed above. Further, web clients 665 can include mobile clients accessing web server 670 through wireless communications means. Users of clients 660 and web clients 665 can include, for example, sales agents, service agents, customer representatives, managers of the business entity using the CRM, and the like.

Implementation of the data mining techniques discussed above offer several advantages over previous solutions. Previous solutions of locating cluster centroids involve selections of initial seeds for centroid calculations that could result in a large number of iterations of a centroid locating calculation algorithm and therefore long computation times. Such long computation times can result in long lag times for results being provided to users and extended periods of unavailability of a database storing the data being analyzed. By performing the preprocessing methods of the present invention, initial seeds can be calculated that are in closer proximity to the actual centroids of clusters of the full data sets. This closer proximity can result in fewer iterations being performed by cluster centroid calculation algorithms, and thereby providing quicker results to a user and shorter data source unavailability.

An Example Computing and Network Environment

As shown above, the present invention can be implemented using a variety of computer systems and networks. An example of one such computing and network environment is described below with reference to FIGS. 7 and 8.

Figure 7:
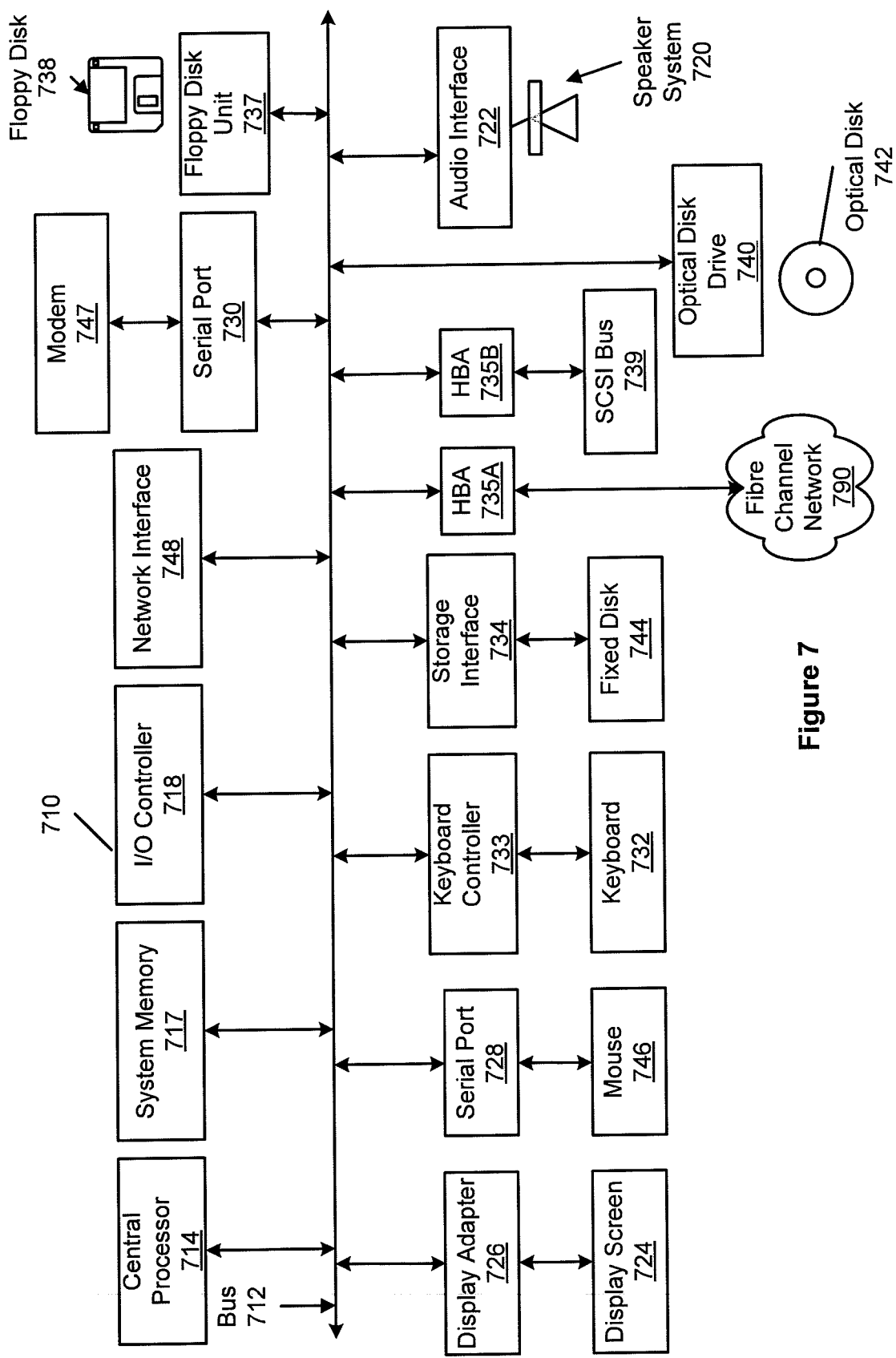
FIG. 7 depicts a block diagram of a computer system suitable for implementing embodiments of the present invention.

FIG. 7 depicts a block diagram of a computer system 710 suitable for implementing aspects of the present invention (e.g., clients 660, web clients 665, and servers 620 and 670).

Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
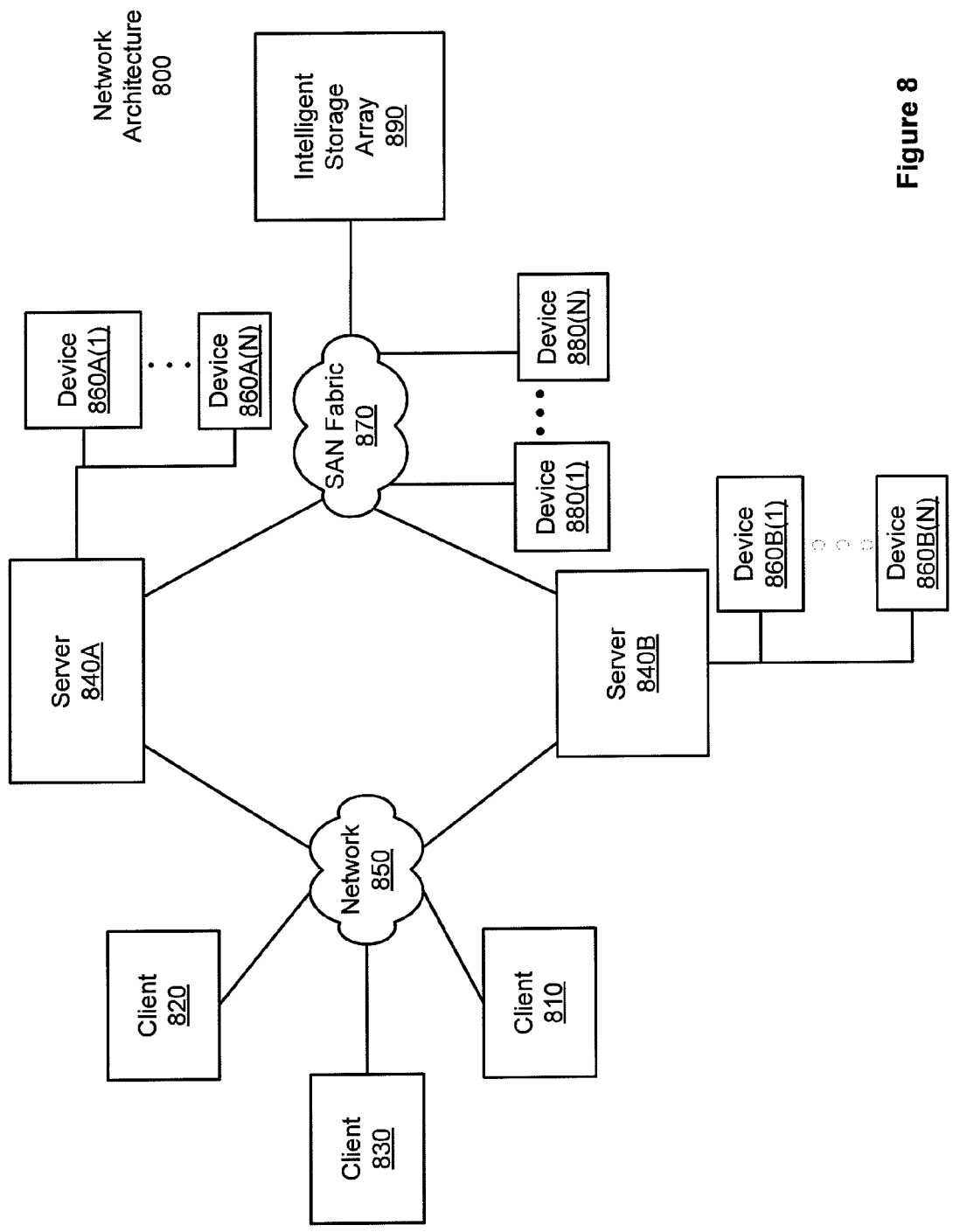
FIG. 8 is a block diagram depicting a network architecture suitable for implementing embodiments of the present invention.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
    selecting a sample set of data points from a set of multidimensional data points;
    selecting a number of data clusters to determine in the set of multidimensional data points;
    determining seed values for a cluster centroid calculation of the number of data clusters using the sample set of data points; and
    performing the cluster centroid calculation for the set of multidimensional data points using the seed values.

2. The method of claim 1 wherein said determining the seed values comprises:
    selecting a first data point of the sample set of data points;
    determining a set of nearest neighbor data points to the first data point, wherein
        the set of nearest neighbor data points is selected from the sample set of data points;
    calculating a first mean location value of the set of nearest neighbor data points and the first data point; and
    setting a first seed value of the seed values equal to the first mean location value.

3. The method of claim 2 wherein the set of nearest neighbor data points comprises a pre-defined number of data points.

4. The method of claim 2 further comprising:
    determining a distance between the first data point and the nearest neighbor data point farthest from the first data point; and
    removing all data points of the sample set of data points that are located within a region defined by the first mean location value and the distance between the first data point and the nearest neighbor data point farthest from the first data point.

5. The method of claim 4 wherein the region comprises a circle for a two-dimensional set of multidimensional data points.

6. The method of claim 4 wherein the region comprises a sphere for a three-dimensional set of multidimensional data points.

7. The method of claim 4 further comprising:
    selecting a second data point of the sample set of data points, after performing said removing all data points located within the region defined by the first mean location value and the distance between the first data point and the nearest neighbor data point farthest from the first data point;
    determining a second set of nearest neighbor data points to the second data point, wherein
        the second set of nearest neighbor data points is selected from the sample set of data points;
    calculating a second mean location value of the set of nearest neighbor data points and the second data point; and
    setting a second seed value of the seed values equal to the second mean location value.

8. The method of claim 1 wherein the cluster centroid calculation comprises a k-means analysis of the set of multidimensional data points.

9. A computer-readable storage medium storing instructions executable by a processor, the instructions comprising:
    a first set of instructions configured to select a sample set of data points from a set of multidimensional data points, wherein the set of multidimensional data points is stored in a second computer-readable storage medium;
    a second set of instructions configured to select a number of data clusters to determine in the set of multidimensional data points;
    a third set of instructions configured to determine seed values for a cluster centroid calculation of the number of data clusters using the sample set of data points; and a fourth set of instructions configured to perform the cluster centroid calculation for the set of multidimensional data points using the seed values.

10. The computer-readable storage medium of claim 9 wherein said third set of instructions further comprises:
    a fifth set of instructions configured to select a first data point of the sample set of data points;
    a sixth set of instructions configured to determine a set of nearest neighbor data points to the first data point, wherein
        the set of nearest neighbor data points is selected from the sample set of data points;
    a seventh set of instructions configured to calculate a first mean location value of the set of nearest neighbor data points and the first data point; and
    a eighth set of instructions configured to set a first seed value of the seed values equal to the first mean location value.

11. The computer-readable storage medium of claim 10 wherein the set of nearest neighbor data points comprises a pre-defined number of data points.

12. The computer readable storage medium of claim 10 storing instructions further comprising:
    a ninth set of instructions configured to determine a distance between the first data point and the nearest neighbor data point farthest from the first data point; and
    a tenth set of instructions configured to remove all data points of the sample set of data points that are located within a region defined by the first mean location value and the distance between the first data point and the nearest neighbor data point farthest from the first data point.

13. The computer-readable storage medium of claim 12 wherein the region comprises a circle for a two-dimensional set of multidimensional data points.

14. The computer-readable storage medium of claim 12 wherein the region comprises a sphere for a three-dimensional set of multidimensional data points.

15. The computer-readable storage medium of claim 12 storing instructions further comprising:
    an eleventh set of instructions configured to select a second data point of the sample set of data points, after performing said removing all data points located within the region defined by the first mean location value and the distance between the first data point and the nearest neighbor data point farthest from the first data point;
    a twelfth set of instructions configured to determine a second set of nearest neighbor data points to the second data point, wherein
        the second set of nearest neighbor data points is selected from the sample set of data points;
    a thirteenth set of instructions configured to calculate a second mean location value of the set of nearest neighbor data points and the second data point; and
    a fourteenth set of instructions configured to set a second seed value of the seed values equal to the second mean location value.

16. The computer-readable storage medium of claim 9 wherein the fourth set of instructions further comprises a fifth set of instructions configured to perform a k-means analysis of the set of multidimensional data points.

17. An apparatus comprising:
    a processor; and
    a memory, coupled to the processor, storing instructions executable by the processor and configured to
        select a sample set of data points from a set of multidimensional data points, wherein the set of multidimensional data points is stored in a storage volume coupled to the processor,
        select a number of data clusters to determine in the set of multidimensional data points,
        determine seed values for a cluster centroid calculation of the number of data clusters using the sample set of data points, and
        perform the cluster centroid calculation for the set of multidimensional data points using the seed values.

18. The apparatus of claim 17 wherein the instructions for determining the seed values further comprise instructions executable by the processor and configured to:
    select a first data point of the sample set of data points;
    determine a set of nearest neighbor data points to the first data point, wherein
        the set of nearest neighbor data points is selected from the sample set of data points;
    calculate a first mean location value of the set of nearest neighbor data points and the first data point; and
    set a first seed value of the seed values equal to the first mean location value.

19. The apparatus of claim 18 further comprising instructions stored in the memory and configured to:
    determine a distance between the first data point and the nearest neighbor data point farthest from the first data point; and
    remove all data points of the sample set of data points that are located within a region defined by the first mean location value and the distance between the first data point and the nearest neighbor data point farthest from the first data point.

20. The apparatus of claim 19 further comprising instructions stored in the memory and configured to:
    select a second data point of the sample set of data points, after performing said removing all data points located within the region defined by the first mean location value and the distance between the first data point and the nearest neighbor data point farthest from the first data point;
    determine a second set of nearest neighbor data points to the second data point, wherein
        the second set of nearest neighbor data points is selected from the sample set of data points;
    calculate a second mean location value of the set of nearest neighbor data points and the second data point; and
    set a second seed value of the seed values equal to the second mean location value.

* * * * *

UNITED STATES PATENT AND TRADEMARK OFFICE
CERTIFICATE OF CORRECTION

| | | |
|---|---|---|
| PATENT NO. | : 8,229,876 B2 | Page 1 of 1 |
| APPLICATION NO. | : 12/552011 | |
| DATED | : July 24, 2012 | |
| INVENTOR(S) | : Roychowdhury | |

It is certified that error appears in the above-identified patent and that said Letters Patent is hereby corrected as shown below:

On the Title page, Item (56) under "Other Publications", line 3, delete "1 ," and insert -- 1, --, therefor.

On the Title page, Item (56) under "Other Publications", line 4, delete "1971 ," and insert -- 1971, --, therefor.

On the Title page, Item (56) under "Other Publications", line 7, delete "ICDS" and insert -- ICDCS --, therefor.

On the Title page, Item (56) under "Other Publications", line 8-9, delete "10.1109/ICDS.2008.40" and insert -- 10.1109/ICDCS.2008.40 --, therefor.

On the Title page, Item (56) under "Other Publications", line 9, delete "2008 ," and insert -- 2008, --, therefor.

On the Title page, Item (56) under "Other Publications", 2nd col. line 11, delete ""Refming" and insert -- "Refining --, therefor.

In column 15, line 23, in Claim 12, delete "computer readable" and insert -- computer-readable --, therefor.

Signed and Sealed this
Sixth Day of November, 2012

David J. Kappos
*Director of the United States Patent and Trademark Office*